US007088757B1

United States Patent
Yu et al.

(10) Patent No.: US 7,088,757 B1
(45) Date of Patent: Aug. 8, 2006

(54) USE OF SPIRO COMPOUNDS AS LASER DYES

(75) Inventors: Nu Yu, Knoxville, TN (US); Josef Salbeck, Kelkheim (DE); Willi Kreuder, Mainz (DE)

(73) Assignee: Semiconductors GmbH (DE)

( * ) Notice: Subject to any disclaimer, the term of this patent is extended or adjusted under 35 U.S.C. 154(b) by 0 days.

(21) Appl. No.: 09/601,434

(22) PCT Filed: Jan. 23, 1999

(86) PCT No.: PCT/EP99/00441

§ 371 (c)(1),
(2), (4) Date: Sep. 1, 2000

(87) PCT Pub. No.: WO99/40655

PCT Pub. Date: Aug. 12, 1999

(30) Foreign Application Priority Data

Feb. 4, 1998 (DE) ................................ 981 01 902

(51) Int. Cl.
*H01S 3/20* (2006.01)
(52) U.S. Cl. .......................................... 372/53; 362/54
(58) Field of Classification Search ................. 372/53, 372/82, 70, 43, 45
See application file for complete search history.

(56) References Cited

U.S. PATENT DOCUMENTS

| 3,523,045 | A | * | 8/1970 | Suzuki et al. ............... 148/33.1 |
| 3,781,711 | A |   | 12/1973 | Drexhage et al. |
| 3,958,815 | A | * | 5/1976 | Poot ........................... 282/27.5 |
| 4,026,705 | A | * | 5/1977 | Crivello ................... 430/280.1 |
| 5,037,578 | A |   | 8/1991 | Kauffman et al. |
| 5,041,238 | A |   | 8/1991 | Kauffman et al. |
| 5,149,807 | A |   | 9/1992 | Hammond et al. |
| 5,237,582 | A | * | 8/1993 | Moses .......................... 372/53 |
| 5,568,417 | A | * | 10/1996 | Furuki ........................ 365/106 |
| 5,840,217 | A | * | 11/1998 | Lupo et al. ................. 252/583 |
| 5,885,638 | A |   | 3/1999 | Lupo et al. |
| 5,989,737 | A | * | 11/1999 | Xie ............................. 428/690 |

FOREIGN PATENT DOCUMENTS

| DE | 3703065 A1 | 8/1987 |
| DE | 0006761 A2 * | 3/1995 |
| DE | 0676461 A2 * | 3/1995 |
| EP | 0 676 461 A2 | 10/1995 |
| EP | 676461 A2 * | 10/1995 |
| WO | WO 97/10617 | 3/1997 |

OTHER PUBLICATIONS

Liphardt, B. et al. *Bifluorophore Laserfarbstoffe zur Steigerung des Wirkungsgrades von Farbstoff-Lasern Laser Dyes, I. Bifluorophoric Laser Dyes for Increase of the Efficiency of Dye Lasers*. Liebigs Annalen der Chemie, vol. 1981, No. 6, Jun. 1981, pp. 1118-1138, XP002030899 (with English abstract).

Sutcliffe, F.K. et al. *The Synthesis and Properties of Dyes and Pigments Containing A 9,9'-Spirobifluorene Residue*. Journal of the Society of Dyers and Colourists, vol. 94, No. 7, Jul. 1978, pp. 306-309, XP002030898.

\* cited by examiner

*Primary Examiner*—Minsun Oh Harvey
*Assistant Examiner*—Dung Nguyen
(74) *Attorney, Agent, or Firm*—Connelly Bove Lodge & Hutz

(57) ABSTRACT

Use of spiro compounds of formula (I), where $K^1$ and $K^2$ are, independently of one another, conjugated systems, as a laser dye.

10 Claims, No Drawings

USE OF SPIRO COMPOUNDS AS LASER DYES

Narrow band width emission of organic dyes in dilute solution is a well known phenomena with so called laser dyes. [for an overview see for example: R. Raue, Laser Dyes, in Ullmann's Encyclopedia of Industrial Chemistry, 5.Ed.] In such an arrangement the dye laser employs a dilute solution of a fluorescent dye. The dye solution is contained in a thin-walled quartz cell, which forms part of a closed system, through which the solution is circulated while the laser is in operation. The active medium may also take the form of a liquid stream, emitted from a jet, that crosses the laser cavity perpendicular to the optical axis. Excitation of the dye is achieved by means of so-called optical pumping, using a source of energy such as a flash lamp; the dye laser can also be stimulated by a gas laser, such as a nitrogen, argon, or krypton laser. The excimer (i.e., excited dimer) laser is frequently used as pumping light source, particularly the xenon chloride or krypton fluoride laser. Laser dyes include a large number of long-known fluorescent compounds, other representatives are optical brighteners and fluorescent dyes. In this case, only solutions of the common laser dyes in a suitable solvent can be used.

Therefore there are many attempts to prepare solid state devices with organic emitters. In that case, solid solutions of organic dyes in a suitable solid matrix, have been applied.

For example using sol-gel processes with organically modified silicates or optically transparent polymers as matrix have been applied [W. Hu, et al. Appl. Opt. 36 (1997) 579; R. Reisfeld, Proc. SPIE-Int. Soc. Opt. Eng. 2288 (1994) 563; S. E. Friberg, et al. J. Mater. Synth. Process. 2 (1994) 29; C. Whitehurst, et al. Proc. SPIE-Int. Soc. Opt. Eng. 1328 (1990) 183].

But in all cases only low concentrations of the laser dye in the matrix can be applied due to quenching processes at higher concentrations. Another problem is the limited photo stability of most of the applied laser dyes.

Very recently, conjugated polymers have been described as a new class of solid-state laser materials. In this case the lasing is evidenced by a dramatic collapse of the emission line width to as little as 7 nm. [M. A. Diaz-Garcia, et al. Synth. Met. 84 (1997) 455; N. Tessler, Synth. Met. 84 (1997) 475; S. V. Frolov, et al. Synth. Met. 84 (1997) 471, 473.]

More recently, vacuum deposited thin films of tris-(8-hydroxyquinoline)aluminium ($Alq_3$) doped with 2.5% of a DCM laser dye have been described to show laser action [V. G. Koziov, et al. Nature 389 (1997) 362]. Using cascade energy transfer to obtain stimulated emission, low molecular host guest systems containing a combination of low concentrations of different laser dyes (of the order of 1%) in a 2-(4-biphenylyl)-5-(4-t-butylphenyl)-1,3,4-oxadiazole (PBD) host has been described [M. Berggren, et al. Nature 389 (1997) 466]; in this paper also the amplifying characteristics of a neat PBD film has been described.

But the low molecular weight systems described suffer from the low (thermal and) morphologic stability, which is required for a stable emission over time.

Surprisingly, it was found that a special class of low molecular organic compounds based on spiro compounds are exceptionally well qualified as active materials in organic solid state light sources with narrow band width emission. Both, in the neat state as well as acting as an host in combination with small amounts of laser dyes. Narrow band width emissions means that the free width at half maximum (FWHM) is equal or below 10 nm.

BRIEF DESCRIPTION OF THE FIGURE

The figure illustrates a laser according to the invention.

The invention accordingly provides for the use of Spiro compounds of the formula (I)

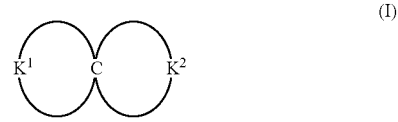

(I)

where $K^1$ and $K^2$ are, independently of one another, conjugated systems, as laser dyes.

Compounds of the formula (I) are readily soluble in customary organic solvents, have improved film-forming properties and have a significantly reduced tendency to crystallize. This makes the production of organic laser devices easier and increases their service life.

Preferred compounds of the formula (I) are 9,9'-spirobifluorene derivatives of the formula (II),

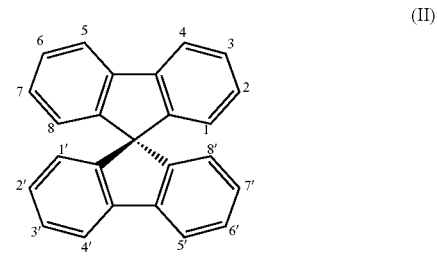

(II)

where the benzo groups can be substituted and/or fused independently of one another.

Particular preference is given to spirobifluorene derivatives of the formula (III)

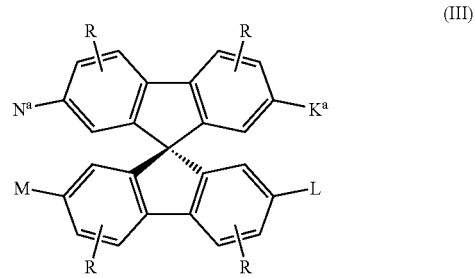

(III)

where the symbols and indices have the following meanings:

$K^a$, L, M, $N^a$ are identical or different and are

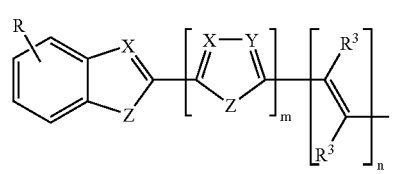

-continued

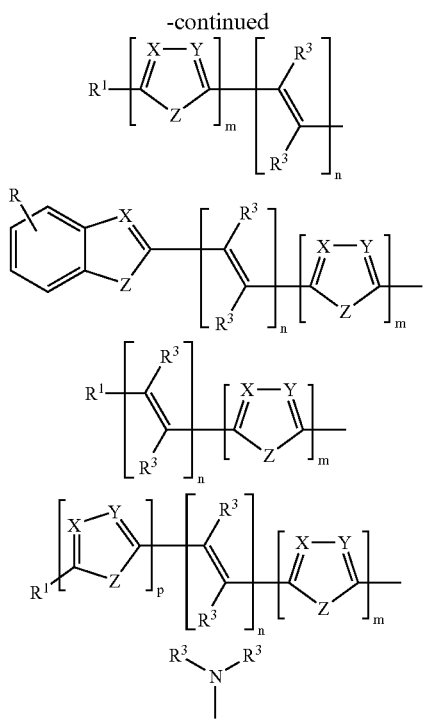

R can be identical or different an each appearance and have the same meanings as $K^a$, L, M, $N^a$ or is H, a linear or branched alkyl, alkoxy or ester group having from 1 to 22, preferably from 1 to 15, particularly preferably from 1 to 22, carbon atoms, —CN, —NO$_2$, —NR$^2$R$^3$, —Ar— or —O—Ar;

Ar is phenyl, biphenyl, 1-naphthyl, 2-naphthyl, 2-thienyl, 2-furyl, with each of these groups being able to bear one or two radicals R, m, n, p are 0, 1, 2 or 3;

X, Y are identical or different and are CR or nitrogen;

Z is —O—, —S—, —NR$^1$—, —CR$^1$R$^4$—, —CH=CH—, —CH=N—;

R$^1$, R$^4$ can be identical or different and have the same meanings as R;

R$^2$, R$^3$ are identical or different and are H, a linear or branched alkyl group having from 1 to 22 carbon atoms, —Ar, 3-methylphenyl.

Preferred compounds of the formula (III) are those of the formulae (IIIa)–(IIIg)

IIIa) $K^a$=L=M=$N^a$ and is selected from the group consisting of:

-continued

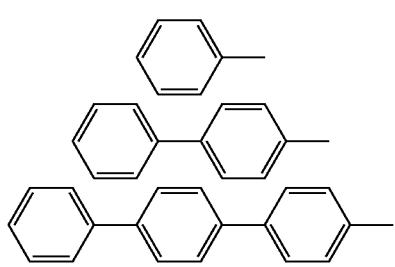

R=C$_1$–C$_{22}$-Alkyl, C$_2$H$_4$SO$_3$—

IIIb) $K^a$M=M=H and $N^a$=L and is selected from the group consisting of:

-continued
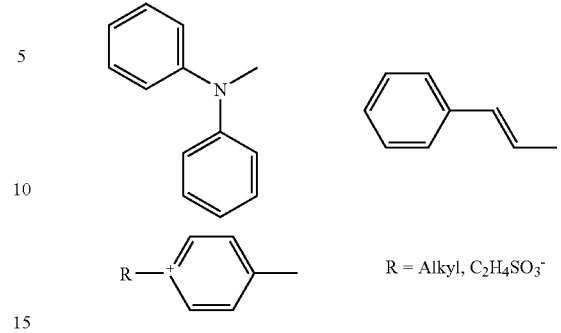
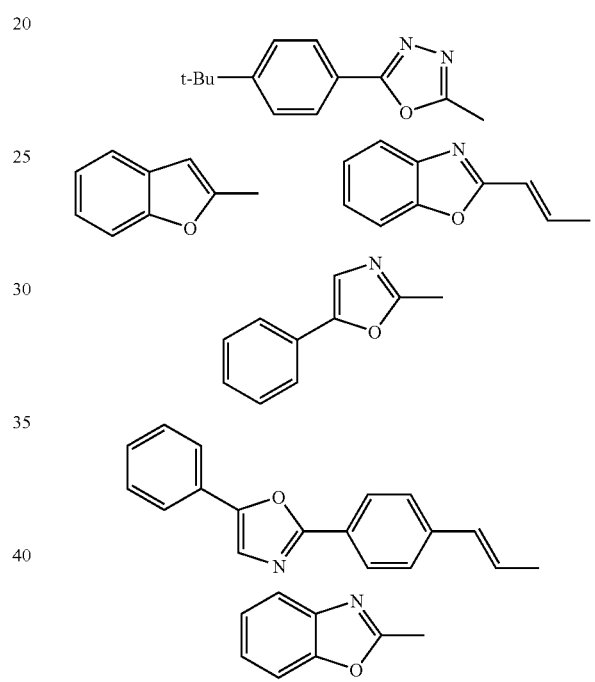
and $N^a = L$ and is selected from the group consisting of:
IIId) $K^a = M$ and is selected from the group consisting of:
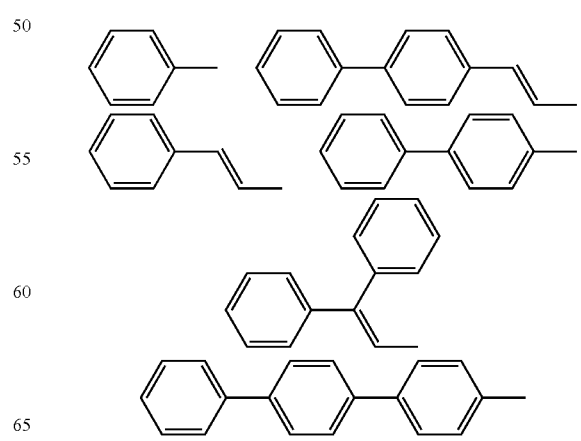
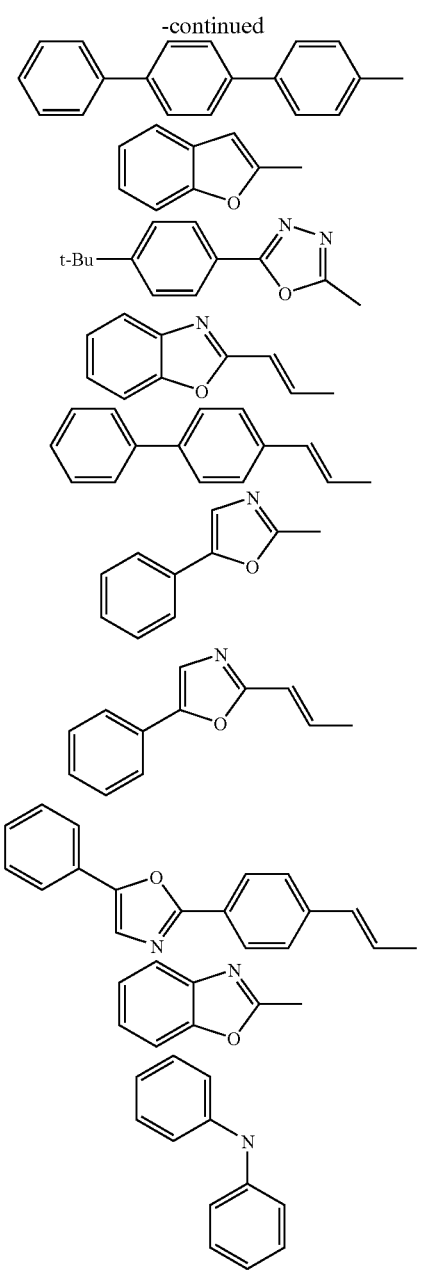
IIIc) $K^a = M$ and is selected from the group consisting of:
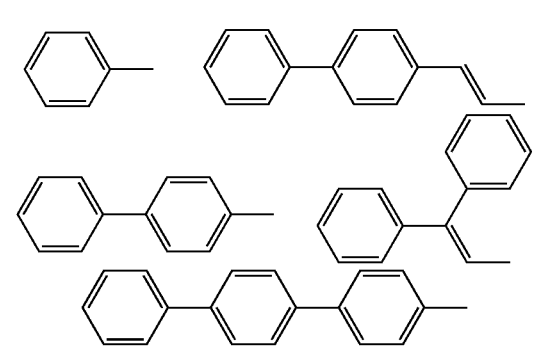

and $N^a$=L and is selected from the group consisting of:
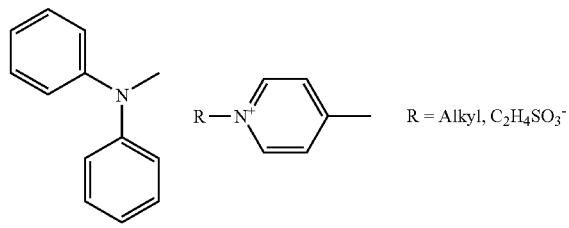
IIIe) $K^a$=L=H and M=$N^a$ and is selected from the group consisting of:
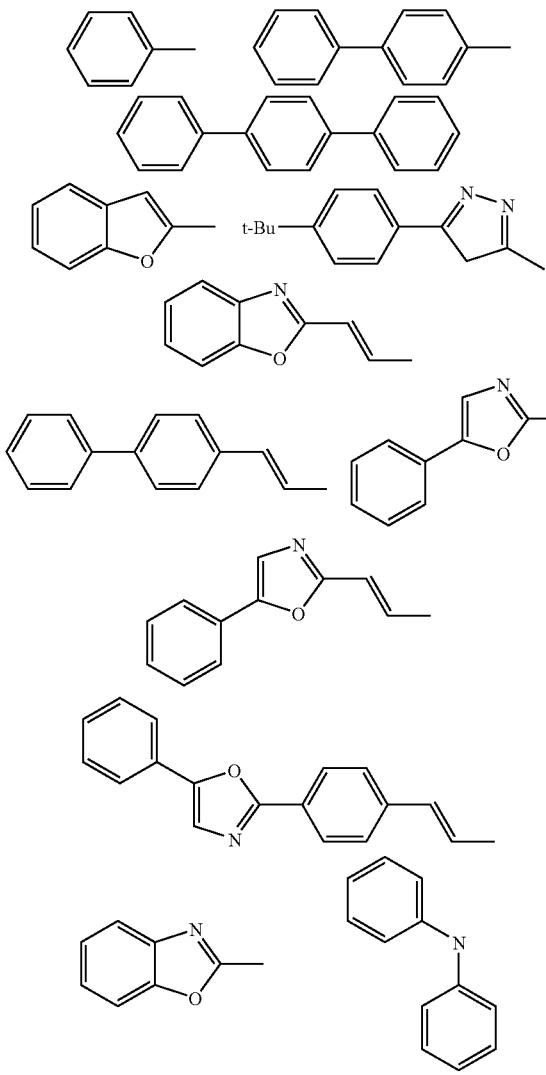
IIIf) $K^a$=L and is selected form the group consisting of:
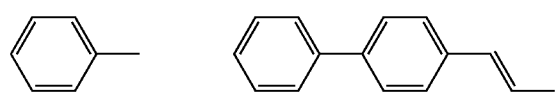
-continued
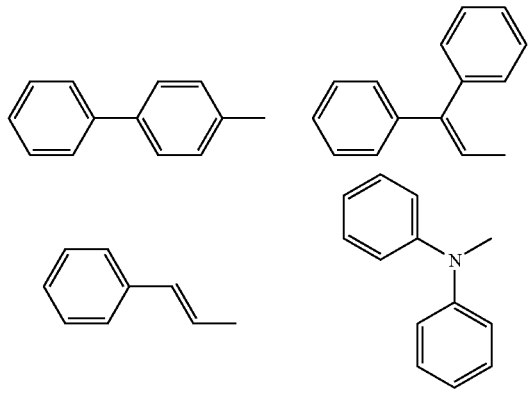
and M=$N^a$ and is selected from the group consisting of:
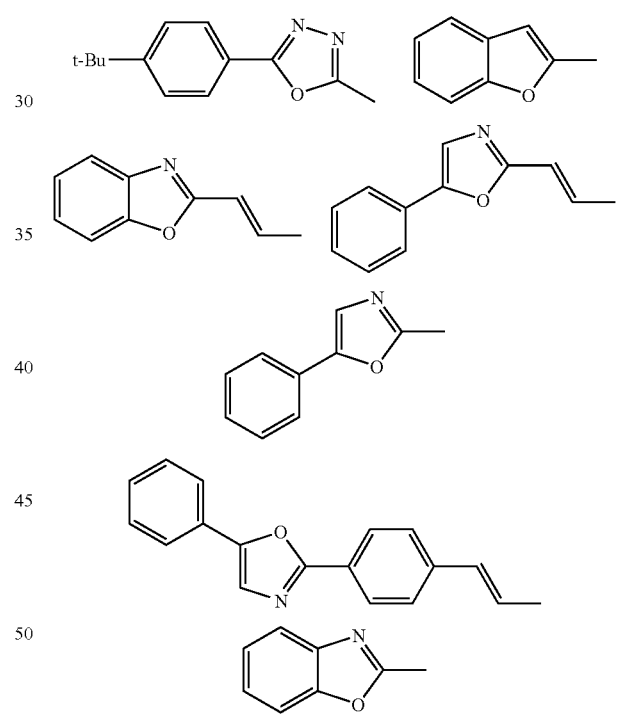
IIIg) $K^a$=L and is selected from the group consisting of:
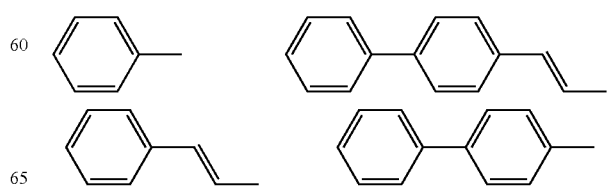

-continued

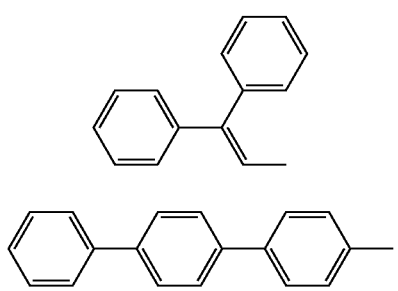

and M=N$^a$ and is selected from the group consisting of:

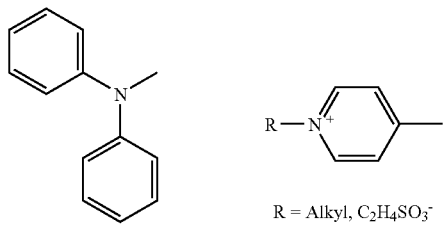

R = Alkyl, C$_2$H$_4$SO$_3^-$

Particularly preferred compounds of the formula (III) are those of the formulae (IIIaa) to (IIIdb):

(IIIaa) K$^a$=L=M=N$^a$ and is selected from the group consisting of:

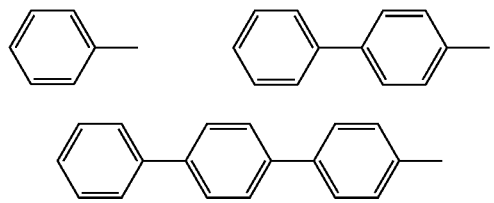

(IIIba) K$^a$=M=H and N$^a$=L and is selected from the group consisting of:

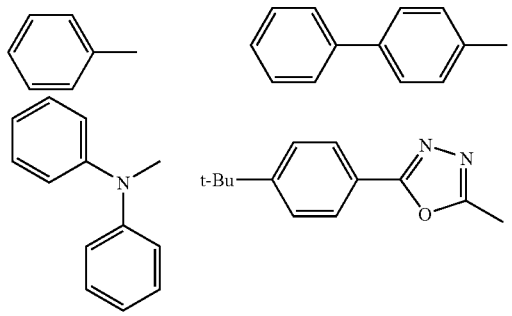

(IIIca) K$^a$=M and is selected from the group consisting of:

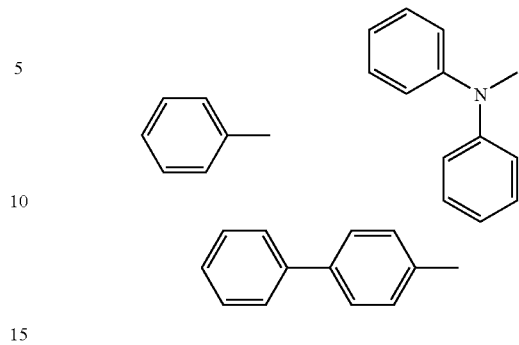

and N$^a$=L and is:

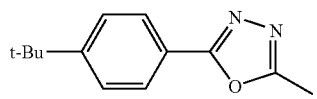

(IIIda) K$^a$=M and is selected from the group consisting of:

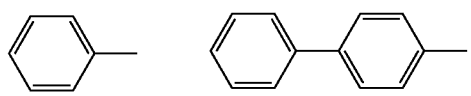

and N$^a$=L and is:

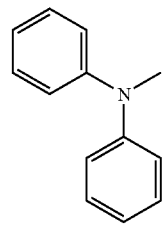

(IIIab) K$^a$=L=M=N$^a$ and is selected from the group consisting of:

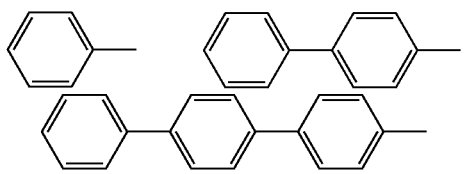

(IIIbb) K$^a$=L=H and M=N$^a$ and is selected from the group consisting of:

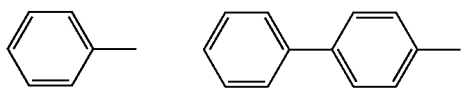

-continued

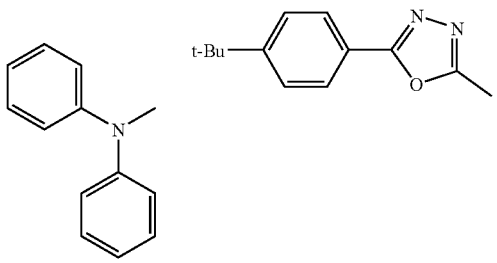

(IIIcb) K$^a$=L and is selected from the group consisting of:

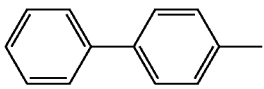

and M=N$^a$ and is:

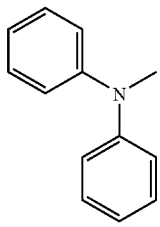

(IIIdb) K$^a$=L and is selected from the group –consisting of:

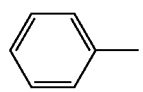 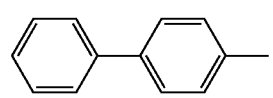

and M=N$^a$ and is:

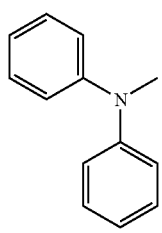

Very particularly preferred Spiro compounds are those of the formula (IV)

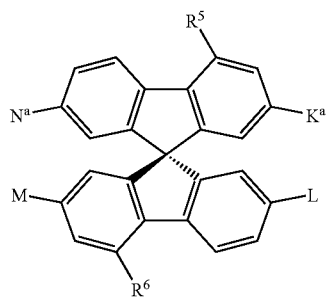

(IV)

where the symbols have the following meanings:

K$^a$, L, M, N$^a$, R$^5$, R$^6$, are identical of different and are one of the groups G1 to G14:

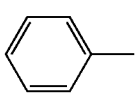
G1

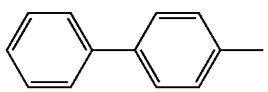
G2

G3

G4

G5

G6

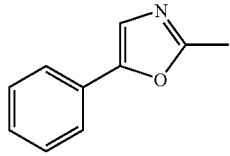
G7

G8

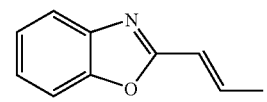
G9

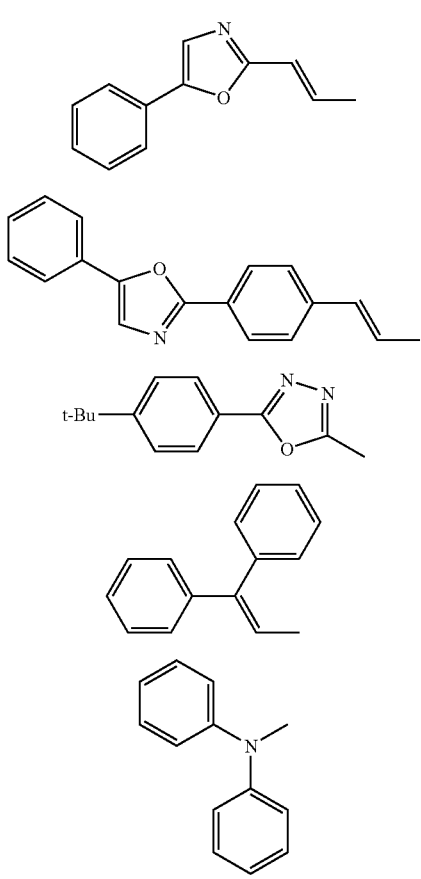

and R$^5$, R$^6$ can also be identical or different and be hydrogen or a linear of branched alkyl, alkyloxy or ester group having from 1 to 22 carbon atoms, —CN or —NO$^2$.

Also particularly preferred are spiro-spiro-compounds as disclosed in German patent application "Spiroverbindungen und deren Verwendung" of Feb. 4, 1998 (applicant Hoechst Research & Technology Deutschland GmbH & Co. KG) which is hereby incorporated by reference.

The spiro compounds used according to the invention are prepared by methods which are known per se in the literature, as are described in standard works on organic synthesis, e.g. Houben-Weyl, Methoden der Organischen Chemie [methods of organic chemistry], Georg-Thieme-Vedag, Stuttgart and in the appropriate volumes of the series "The Chemistry of Heterocyclic Compounds" by A. Weissberger and E. C. Taylor (editors).

The preparation is here carried out under reaction conditions which are known and suitable for said reactions. Use can also be made of variants which are known per se and are not mentioned in more detail here.

Compounds of the formula (III) are obtained, for example, starting form 9,9'-spirobifluorene whose synthesis is described, for example, by R. G. Clarkson, M. Gomberg, J. Am. Chem. Soc. 52 (1930) 2881.

The compounds of the formula (IIIa) can be prepared, for example, starting with a tetrahalogenation of the 9,9'-spirobifluorene in the 2,2',7,7' positions an a subsequent substitution reaction (see, for example, U.S. Pat. No. 5,026,894) or via a tetraacetylation of the 9,9'-spirobifluorene in the 2,2', 7,7' positions with subsequent C—C linkage after conversion of the acetyl groups into aldehyde groups or heterocycle formation after conversion of the acetyl groups into carboxylic acid groups.

The compounds of the formula (IIIb) can be prepared, for example, by a similar method to those of the formula IIIa, with the stoichiometric ratios in the reaction being selected in such a way that the 2,2' or 7,7' positions are functionalized (see, for example, J. H. Weisburger, E. K. Weisburger, F. E. Ray, J. Am. Chem. Soc. 72 (1959) 4253; F. K. Sutcliffe, H. M. Shahidi, D. Paterson, J. Soc. Dyers Colour 94 (1978) 306 and G. Haas, V. Prelog, Helv. Chim. Acta 52 (1069) 1202).

The compounds of the formula (IIIc) can be prepared, for example, by dibromination in the 2,2' positions and subsequent diacetylation in the 7,7' positions of the 9,9'-spirobifluorene and subsequent reaction by a similar method to that for the compounds IIIa.

Compounds of the formulae (IIIe)–(IIIg) can be prepared, for example, by selection of suitably substituted starting compounds in the buildup of the spirobifluorene, e.g. 2,7-dibromospirobifluorene can be built up from 2,7-dibromofluorenone and 2,7-dicarbethoxy-9,9-spirobifluorene by use of 2,7-dicarbethoxyfluorenone. The free 2',7' positions of the spirobifluorene can then be independently further substituted.

For the synthesis of the groups K$^a$, L, M, N$^a$, reference may be made, for example, to DE-A 23 44 732, 24 50 088, 24 29 093, 25 02 904, 26 36 684, 27 01 591 and 27 52 975 for compounds having 1,4-phenylene groups; DE-A 26 41 724 for compounds having pyrimidine-2,5-diyl groups; DE-A 40 26 223 and EP-A 0 391 203 for compounds having pyridine-2,5-diyl groups; DE-A 32 31 462 for compounds having pyridazine-3,6-diyl groups; N. Miyaura, T. Yanagi and A. Suzuki in Synthetic Communications 11 (1981) 513 to 519, De-A 3,930,663, M. J. Sharp, W. Cheng, V. Snieckus in Tetrahedron Letters 28 (1987), 5093; G. W. Gray in J. Chem. Soc. Perkin Trans 11 (1989) 2041 and Mol. Cryst. Liq. Cryst. 172 (1989) 165, Mol. Cryst. Liq. Cryst. 204 (1991) 43 and 91; EP-A 0,449,015; WO 89/12039; WO 89/03821; EP-A 0,354,434 for the direct linking of aromatics and heteroaromatics.

The preparation of disubstituted pyridines, disubstituted pyrazines, disubstituted pyrimidines and disubstituted pyridazines is given, for example, in the appropriate volumes of the series "The Chemistry of Heterocyclic Compounds" by A. Weissberger and E. C. Taylor (editors).

The excitation of the above described active narrow band width emitting material can be achieved by optical excitation with an intense light source like a laser (or a flash light) as described and demonstrated in the examples included.

The excitation can also be achieved by electrically pumping in an organic light emitting diode thereby using a special device structure.

A second item of this patent is therefore and electrically pumped device structure for an organic light emitting diode, using the above mentioned emitting materials. An organic laser device 10 of the invention comprises, in order, a substrate (20), a bottom electrode layer (22), an organic layer structure (24) comprising at least one spiro compound 26 of the formula I, and a top electrode layer (28) within a laser cavity (30).

Substrate is made from glass, quartz glass, ceramic, a polymer, such as polyimide, polyester, polyethylene terephthalate, polycarbonate, polyethylene, polyvinyl chloride, or a single crystal semiconductor selected from the group consisting of either undoped, lightly doped, or heavily doped Si, Ge, GaAs, GaP, GaN, GaSb, InAs, InP, InSb, and Al$_x$Ga$_{1-x}$As where x is from 0 to 1.

The organic laser device can be viewed as a diode which is forward biased when the anode is at a higher potential than the cathode. Under these conditions, bottom electrode layer acts as an anode for hole (positive charge carrier) injection when this bottom electrode is preferably made from a high work function material selected, e.g., from nickel, gold, platinum, palladium, selenium, iridium or an alloy of any combination thereof, tin oxide, indium tin oxide (ITO) or copper iodide, also, an electroconductive polymer such as poly (3-methylthiophene), polyphenylene sulfide or polyaniline (PANI) or poly-3,4-ethylene dioxythiophene (PEDOT). These materials can be used independently or by layering two or more materials such as by film coating PANI or PEDOT on ITO.

On the other hand, top electrode layer can act as a cathode for electron injection when this top electrode is made from a low work function material, preferably a metal or metal alloy, especially selected from, e.g., lithium, aluminum, beryllium, magnesium, calcium, strontium, barium, lanthanum, hafnium, indium, bismuthium, cer, praseodymium, neodymium, samarium, europium, gadolinium, terbium, dysprosium, holmium, erbium, thulium, ytterbium, and lutetium or an alloy of any combination thereof or an alloy of one of this metals with another metal.

The laser cavity provides a feedback mechanism to allow one frequency mode for resonance and it is made by external grating, or distributed feedback, or distributed Bragg reflector.

EXAMPLES

A. Starting Compounds a) Synthesis of 9,9'-spirobifluorene 6.3 g of magnesium turnings and 50 mg of anthracene are initially placed in 120 ml of dry diethyl ether under argon in a 1 l three-necked flask fitted with reflux condenser and the magnesium is activated for 15 minutes using ultrasound.

62 g of 2-bromobiphenyl are dissolved in 60 ml of dry diethyl ether. About 10 ml of this solution are added to the initially charged magnesium to initiate the Grignard reaction.

After the reaction starts, the 2-bromobiphynyl solution is added dropwise with a further ultrasound treatment in such a way that the solution gently boils under reflux. After the addition is complete, the reaction mixture is boiled under reflux for a further hour with ultrasound.

48.8 g of 9-fluorenone are dissolved in 400 ml of dry diethyl ether and, with further ultrasound treatment, are added dropwise to the Grignard solution. After the addition is complete, the mixture is boiled for a further 2 hours. The yellow magnesium complex of 9-(2-biphenyl)-9-fluorenol precipitated after cooling the reaction mixture is filtered off with suction and washed with a little ether. The magnesium complex is hydrolyzed in 800 ml of ice water containing 40 g of ammonium chloride. After stirring for 60 minutes, the 9-(2-biphenyl)-9-fluorenol formed is filtered off with suction, washed with water and sucked dry.

The dried 8-(2-biphenyl)-9-fluorenol is the dissolved in 500 ml of hot glacial acetic acid. 0.5 ml of concentrated hydrochloric acid is added to this solution. The solution is allowed to boil for a few minutes and the 9,9'-spirobifluorene formed is precipitated from the hot solution using water (water added until the solution starts to become turbid). After cooling, the product is filtered off with suction and washed with water. The dried product is further purified by recrystallization from ethanol. This gives 66 g (80%, based on 2-bromobiphenyl) of 9,9'-spirobifluorene as colorless crystals, m.p. 198° C.

b) 2,2'-Dibromo-9,9'-spirobifluorene (F. K. Sutcliffe, H. M. Shahidi, D. Patterson, J. Soc. Dyers Colour 94 (1978) 306)

3.26 g (10.3 mmol) of 9,9'-spirobifluorene are dissolved in 30 ml of methylene chloride and admixed with 5 mg of $FeCl_3$ (anhydrous) as catalyst. The reaction flask is protected from light. 1.12 ml (21.8 mmol) of bromine in 5 ml of methylene chloride are added dropwise over a period of 30 minutes while stirring. After 24 hours, the resulting brown solution is washed with saturated aqueous $NaHCO_3$ solution and water to remove excess bromine. The organic phase is, after drying over $Na_2SO_4$, evaporated on a rotary evaporator. The white residue is recrystallized from methanol, giving 3.45 g (70%) of the dibromo compound as colorless crystals, m.p. 240° C.

c) 2,2',7,7'-Tetrabromo-9,9'-spirobifluorene 80 mg (0.5 mmol) of anhydrous $FeCl_3$ are added to a solution of 3.16 g (10.0 mmol) of 9,9'-spriobifluorene in 30 ml of methylene chloride, and 2.1 ml (41 mmol) of bromine in 5 ml of methylene chloride are added dropwise over a period of 10 minutes. The solution is refluxed for 6 hours. On cooling, the product precipitates. The precipitate is filtered off with suction and washed with a little cold methylene chloride. After drying, 6.0 g (95%) of the tetrabromo compound are obtained as a white solid.

d) 2-Bromo-9,9'-spirobifluorene and 2,2'7-tribromo-9,9'-spirobifluorene can be prepared in a similar manner using different stoichiometry e) 9,9'-Spirobifluorene-2,2'-dicarboxylic acid from 2,2'-dibromo-9,9'-spirobifluorene via 2,2'-dicyano-9,9'-spirobifluorene 1.19 g of 2,2'-dibromo-9,9'-spirobifluorene and 0.54 g of CuCN are heated under reflux in 5 ml of DMF for 6 hours. The brown mixture obtained is poured into a mixture of 3 g of $FeCl_3$ (hydrated) and 1.5 ml of concentrated hydrochloric acid in 20 ml of water. The mixture is maintained at from 60 to 70° C. for 30 minutes, to destroy the Cu complex. The hot aqueous solution is extracted twice with toluene. The organic phases are then washed with dilute hydrochloric acid, water and 10% strength aqueous NaOH. The organic phase is filtered and evaporated. The yellow residue obtained is recrystallized from methanol. This gives 0.72 g (80%) of 2,2'-dicyano-9,9'-spirobifluorene as pale yellow crystals (melting range from 215 to 245° C.).

3 g of 2,2'-dicyano-9,9'-spirobifluorene are heated under reflux with 25 ml of 30% strength aqueous NaOH and 30 ml of ethanol for 6 hours. The disodium salt of the spirobifluorenedicarboxylic acid is precipitated as a yellow solid which is filtered of and heated in 25% strength aqueous HCl to obtain the free acid. The spirobifluorene dicarboxylic acid is recrystallized form glacial acetic acid. This gives 2.2 g (66.6%) of white crystals (m.p. 376° C., IR bands 1685 cm$^{-1}$ C=O).
9,9'-Spirobifluorene-2,2',7,7'-tetracarboxylic acid can be prepared in a similar manner form 2,2',7,7'-tetrabromo-9,9'-spirobifluorene.

f) 9,9'-Spirobifluorene-2,2'-dicarbonxylic Acid from 9,9'-spirobifluorene via 2,2'-diacetyl-9,9'-spirobifluorene (G. Haas, V. Prelog, Helv. Chim. Acta 52 (1969) 1202; V. Prelog, D. Bedekovic, Helv. Chim. Acta 62 (1979) 2285)

A solution of 3.17 g of 9,9'-spirobifluorene in 30 ml of absolute carbon disulfide is, after addition of 9.0 g of finely powdered, anhydrous AlCl$_3$, admixed dropwise over a period of 10 minutes while stirring with 1.58 g of acetyl chloride in 5 ml of absolute carbon disulfide and is boiled under reflux for 1 hour. The mixture is evaporated to dryness under reduced pressure and is admixed at 0° C. with 100 g of ice and 50 ml of 2N hydrochloric acid. After a conventional workup, the crude product is separated chromatographically over silica gel using benzene/ethyl acetate (10:1). This gives 3.62 g (89%) of 2,2'-diacetyl-9,9'-spirobifluorene (recrystallized from chloroform/ethyl acetate, m.p. from 255 to 257° C.) and 204 mg of 2-acetyl-9,9'-spirobifluorene (recrystallized from chloroform/benzene, m.p. 225° C.). [In addition, the chromatography also enables the 2,2',7-triacetyl-9,9'-spirobifluorene (m.p. from 258 to 260° C.) and 2,2',7,7'-tetraacetyl-9,9'-spirobifluorene (m.p. >300° C.) to be isolated, recrystallized from ethyl acetate/hexane].

2,2',7-Triacetyl- and 2,2',7,7'-tetraacetyl-9,9'-spirobifluorene can be obtained as main product using a different stoichiometry.

First 7.2 g of bromine and then a solution of 3.0 g of 2,2'-diacetyl-9,9'-spirobifluorene in a little dioxane are added dropwise at 0° C. while stirring to a solution of 6.0 g of sodium hydroxide in 30 ml of water. After stirring for a further hour at room temperature, the clear yellow solution is admixed with 1 g of sodium hydrogen sulfite dissolved in 20 ml of water. After acidification with concentrated hydrochloric acid, the precipitated colorless product is filtered off and washed with a little water. Recrystallization with ethanol gives 9,9'-spirobifluorne-2,2-dicarboxylic acid as clear prisms (m.p. 352° C.).

9,9'-Spirobifluorene-2-carboxylic acid, 9,9'-spirobifluorene-2,2',7'-tricarboxylic acid and 9,9'-spirobifluorene-2,2',7,7'-tetracarboxylic acid can be prepared in a similar manner.

g) 2,2'-Bis(bromomethyl)-9,9'-spirobifluorene from 2,2'-dicarboxy-9,9'-spirobifluorene via 9,9'-spirobifluorene-2,2'-dimethanol (V. Prelog, D. Bedekovic, Helv. Chim. Acta 62 (1979) 2285)

At room temperature, 10 g of a 70% strength by weight solution of sodium dihydrobis(2-methoxyethoxy)aluminate (Fluka) in benzene are slowly added dropwise to a suspension of 2.0 g of 2,2'-dicarboxy-9,9'-spirobifluorene (free carboxylic acid) in 20 ml of benzene. After boiling for 2 hours under reflux, during which time the carboxylic acid dissolves, the excess reducing agent is decomposed at 10° C. using water, the mixture is acidified with concentrated hydrochloric acid and is extracted by shaking with chloroform.

After washing with water and drying over magnesium sulfate, the organic phase is evaporated and the residue is recrystallized from benzene. This gives 1.57 g of 9,9'-spirobifluorene-2,2'-dimethanol (m.p. from 254 to 255° C.). 91.5 g of a 33% strength aqueous solution of hydrogen bromide in glacial acetic acid are added dropwise to a solution of 13.5 g of 9,9'-spirobifluorene-2,2'-dimethanol in 400 ml of benzene and the mixture is boiled under reflux for 7 hours. The mixture is then admixed with 200 ml of water and the organic phase is washed with water, dried over magnesium sulfate and evaporated. Chromatography over silica gel using benzene gives 11.7 g 2,2'-bis(bromomethyl)-9,9'-spirobifluorene as colorless platelets (m.p. from 175 to 177° C.).

h) A solution of 380 mg of 9,9'-spirobifluorene-2,2'-dimethanol in 15 ml of toluene is admixed with 5 g of chromium(VI) oxide on graphite (Seloxcette, Alpha Inorganics) and the mixture is refluxed for 48 hours under nitrogen. It is then filtered with suction through a glass filter and the filtrate is evaporated. Chromatography over silica gel using chloroform and crystallization from methylene chloride/ether gives 152 mg of 9,9'-spirobifluorene-2,2'-dicarbaldehyde (m.p. >300° C.) and 204 mg of 2'-hydroxymethyl-9,9'-spirobifluorene-2-carbaldehyde (m.p. from 262 to 263° C.).

i) 2,2'-Diamino-9,9'-spirobifluorene

A mixture of 150 ml of concentrated aqueous HNO$_3$ and 150 ml of glacial acetic acid are added dropwise to a boiling solution of 15.1 g of 9,9'-spirobifluorene in 500 ml of glacial acetic acid over a period of 30 minutes and the solution is subsequently refluxed for a further 75 minutes. After cooling and allowing the solution to stand for 1 hour, the same volume of water is added and the product is thereby precipitated. After filtration with suction, 18.5 g of yellow crystals (m.p. from 220 to 224° C.) of 2,2'-dinitro-9,9'-spirobifluorene are obtained. Recrystallization from 250 ml of glacial acetic acid gives 12.7 g of pale yellow crystalline needles (m.p. from 245 to 249° C., analyrtically pure from 249 to 250° C.).

A mixture of 4.0 of dinitrospirobifluorene and 4.0 of iron powder are heated under reflux in 100 ml of ethanol, while 15 ml of concentrated HCl are added dropwise over a period of 30 minutes. After refluxing for a further 30 minutes, excess iron is filtered off. The green filtrate is added to a solution of 400 ml of water, 15 ml of concentrated NH$_4$OH and 20 g of sodium potassium tartrate. The white diamine is filtered off from the dark green solution of the iron complex. To purify the diamine, it is dissolved in dilute HCl and stirred at room temperature with activated carbon (Darco) and filtered off. The filtered solution is neutralized dropwise with NH$_4$OH while stirring (precision glass stirrer) and the precipitated product is filtered off with suction. This gives 3.5 g of white 2,2'-diamino-9,9'-spirobifluorene which can be recrystallized from ethanol (m.p. 243° C.).

j) Synthesis of 2,2',7,7'-tetrabromo-9,9'-spirobifluorene by bromination of solid 9,9'-spirobifluorene using bromine vapor 3.16 g (10 mmol) of finely powdered 9,9'-spirobifluorene are placed in a flat porcelain evaporating dish (Ø 2 about 15 cm). This dish is placed in a desiccator (Ø about 30 cm), on the perforated intermediate plate. On the bottom of the desiccator there are 15.6 g (4.8 ml, 96 mmol) of bromine in a crystallizing dish. The desiccator is closed, but with the ventilation tap opened so that the HBr formed can escape. The desiccator is placed overnight in the fume hood. On the next day, the porcelain dish containing the product, which has been colored orange by bromine, is taken from the desiccator and left to stand in the fume hood for at least a further 4 hours so that excess bromine and HBr can escape.

The product is dissolved in 150 ml of dichloromethane and washed until colorless with 50 ml each of sodium sulfite solution (saturated), sodium hydrogen carbonate solution (saturated) and water. The dichloromethane solution is dried over sodium sulfate and evaporated on a rotary evaporator. The residue is purified by recrystallization from dichloromethane/pentane 4:1.

Yield: 5.7 (92%) of colorless crystals.

$^1$H-NMR (CDCl$_3$, ppm): 6.83 (d, J=1.83 Hz, 4H, H-1,1', 8,8'); 7.54 (dd; J=7.93, 1.83 Hz, 4H, H-3,3',6,6'); 7.68 (d, J=7.93 Hz, 4H, H-4,4',5,5').

k) Synthesis from 2,2',4,4',7,7'-hexabromo-9,9'-spirobifluorene 200 mg of anhydrous FeCl$_3$ are added to a solution of 3.16 g (10 mmol) of 9,9'-spirobifluorene in 20 ml of methylene chloride and the mixture is treated with ultrasound. The reaction flask is protected from light by means of aluminum foil. Subsequently, at the boiling point, 9.85 g (3.15 ml, 62 mmol) of bromine in 5 ml of methylene chloride are added dropwise over a period of 15 minutes. The solution is boiled under reflux and treated with ultrasound for a further 20 hours. After cooling, petroleum ether is added and the mixture is filtered with suction. The product is further purified by recrystallization from THF/methanol and drying for 5 hours at 80° C. Yield: 6.15 g (77%) of colorless crystals.

$^1$H-NMR (CDCl$_3$, ppm): 6.76 (d, J=1.53 Hz, 2H, H 1,1'); 6.84 (d, J=1.83 Hz, 2H, H-8,8'); 7.60 (dd, J=8.54, 1.83 Hz, 2H, H-6,6'); 7.75 (d, J=1.53 Hz, 2H, H-3,3'); 8.49 (d, J=8.54 Hz, 2H, H-5 m5').

l) Synthesis of 2,7-dibromo-9,9'-spirobifluorene

The Grignard reagent prepared from 0.72 g (30 mmol of magnesium turnings and 5.1 ml (30 mmol) of 2-bromobiphenyl in 15 ml of diethyl ether is added dropwise over a period of 2 hours, while stirring (in an ultrasonic bath), to a boiling suspension of 10.0 g (29.6 mmol) of 2,7 dibromo-9-fluorenone in 100 ml of dry diethyl ether. After the addition is complete, the mixture is boiled for a further 3 hours. After cooling overnight, the precipitated solid is filtered off with suction and washed with cold ether. The magnesium complex filtered off is hydrolyzed in a solution of 15 g of ammonium chloride in 250 ml of ice water. After 1 hour, the 9-(2-biphenylyl)-2,7-dibromo-9-fluorenol formed is filtered off with suction, washed with water and sucked dry. For the ring-closure reaction, the dried fluorenol is boiled in 100 ml of glacial acetic acid for 6 hours, after addition of 3 drops of concentrated HCl. The mixture is allowed to crystallize overnight, the product formed is filtered off with suction and is washed with glacial acetic acid and water.

Yield: 11 g (77%) of 2,7-dibromo-9,9'-spirobifluorene. It can be further purified by recrystallization from THF.

$^1$H-NMR (CDCl$_3$, ppm): 6.73 (sd, J=7.63 Hz, 2H, H-1', 8'); 6.84 (d, J=1.83 Hz, 2H, H-1,8); 7.15 (td, J=7.63, 1.22 Hz, 2H, h-2',7'); 7.41 (td, J=7.63, 1.22 Hz, 2H, H-3',6'); 7.48 (dd, J=8.24, 1.83 Hz, 2H, H-3,6); 7.67 (d, J=8.24 Hz; 2H; H-4,5); 7.85 (d, J=7.63, 2H, H-4',5').

m) Synthesis of 2,7-dicarbethoxy-9,9'-spirobifluorene

The Grignard reagent prepared from 0.97 g (40 mmol) of magnesium turnings and 9.32 g (6.8 ml, 40 mmol) of 2-bromobiphenyl) in 50 ml of dry diethyl ether is added dropwise over a period of 2 hours to a boiling solution of 13 g (40 mmol) of 2,7 dicarbethoxy-9-fluorenone in 100 ml of dry diethyl ether. After the addition is complete, the mixture is boiled for a further 3 hours. After cooling overnight, the precipitated solid is filtered off with suction and washed with cold ether. The magnesium complex filtered off with suction is hydrolyzed in a solution of 15 g of ammonium chloride in 250 ml of ice water. After 1 hour, the 9-(2-biphenyl)-2,7-dicarbethoxy-9-fluorenol formed is filtered off with suction, washed with water and sucked dry. For the ring closure reaction, the dried fluorenol is boiled in 100 ml of glacial acetic acid fro 6 hours, after addition of 3 drops of concentrated HCl. The mixture is allowed to crystallize overnight, the product formed is filtered off with suction and washed with glacial acetic acid and water.

Yield: 15.1 g (82%) of 2,7-dicarbethoxy-9,9'-spirobifluorene. It can be further purified by recrystallization from ethanol.

$^1$H-NMR (CDCl$_3$, ppm): 1.30 (t, J=7.12 Hz, 5H, ester-CH$_3$); 4.27 (q, J=7.12 Hz, 4H, ester-CH$_2$); 6.68 (d, J=7.63 Hz, 2H, H-1',8'); 7.11 (td, J=7.48, 1.22 Hz, 2H, H-2',7'); 7.40 (td, J=7.48, 1.22 Hz, 4H, H-1,8,3',6'); 7.89 (dt, J=7.63, 0.92 Hz, 2H, H-4',5'); 7.94 (dd, J=7.93, 0.6 Hz, 2H, H-4,5); 8.12 (dd, J=7.93, 1.53 Hz, 2H, H-3,6).

n) Synthesis of 2,7-dibromo-2',7'-diiodo-9,9'-spirobifluorene

In a 250 ml of three-necked flask fitted with reflux condenser and dropping funnel, a suspension of 2.37 g of 2,7 dibromo-9,9'-spirobifluorene in 50 ml of glaciyl acetic acid is admixed at 80° C. with 5 ml of water and, after addition of 2 ml of concentrated sulfurid acid, 1.27 g of iodine, 0.53 iodic acid and 5 ml of carbon tetrachloride, is stirred until the iodine color disappears. The solid is subsequently filtered off with suction and washed well with water. After drying, the precipitate is dissolved in 150 ml of dichloromethane and washed successively with Na$_2$SO$_3$ solution, NaHCO$_3$ solution and water. The dichloromethane phase is dried over Na$_2$SO$_4$ and subsequently evaporated. This gives colorless crystals of 2,7 dibromo-2',7'-diiodo-9,9'-spirobifluorene in quantitative yield. It can be further purified by recrystallization from dichloromethane/pentane.

6.80 (d, J=1.83 Hz, 2H), 6.99 (d, J=1.53 Hz, 2H), 7.51 (dd, J=8.24, 1.83 Hz, 2H), 7.54 (d, J=7.93 Hz, 2H), 7.65 (d, J=8.24 Hz, 2H), 7.72 (dd, J=8.24, 1.53 Hz, 2H).

SYNTHESIS EXAMPLES

Example 1

2,2'-Bis(benzofuran-2-yl)-9,9'-spirobifluorene (using a method similar to that of W. Sahm, E. Schinzel, P. Jürges, Liebigs Ann. Chem. (1974) 523)

2.7 g (22 mmol) of salicylaldehyde and 5.0 g (10 mmol) of 2,2'-bis(bromomethyl)-9,9'-spirobifluorene are dissolved at room temperature in 15 ml of DMF and admixed with 0.9 g (22.5 mmol) of pulverized NaOH and a spatula tip of KI. The miture is heated to boiling and stirred for 1 hour at the boiling point. After cooling, the reaction solution is admixed with a mixture of 0.5 ml of concentrated hydrochloric acid, 7 ml of water and 7 ml of methanol. The mixture is stirred for a further 1 hour at room temperature, the crystalline reaction products are filtered off with suction, washed with cold methanol, then with water and dried in vacuo at 60° C. This gives 4.6 g (79%) 2,2'-bis(2-formylphenyloxymethyl)-9,9'-spirobifluorene.

5.85 g (10 mmol) 2,2'-bis(2-formylphenyloxymethyl)-9,9'-spirobifluorene are mixed in 10 ml of toluene with 2.1 g (22.5 mmol) of freshly distilled aniline. A spatula tip of p-toluenesulfonic acid is added and the mixture is heated at the boiling point (from about 3 to 5 hours). On cooling the reaction mixture, the corresponding bis-benzylidene-phenylamine precipitate in crystalline form. It is filtered off with suction, washed with methanol and dried in vacuo at 60° C. It can be further purified by recrystallization from DMF.

7.35 g (10 mmol) of the bis-benzylidenephenylamine and 0.62 g (11 mmol) of KOH are introduced under nitrogen into 30 ml of DMF. The mixture is subsequently heated at 100° C. for 4 hours while stirring. After cooling to room temperature, the precipitate is filtered off with suction and washed with a little DMF and water. After drying at 60° C. in a vacuum drying oven, the 2,2'-bis(benzofuran-2-yl)-9,9'-spirobifluorene can be purified by recrystallization from methyl benzoate.

Example 2

2,2',7,7'-Tetra(benzofuran-2-yl)-9,9'-spirobifluorene can be prepared by a similar method to Example 1 using an appropriately altered stoichiometry.

Example 3

2,2',7,7'-Tetraphenyl-9,9'-spirobifluorene 5 g (7.9 mmol) of 2,2',7,7'-tetrabromo-9,9'-spirobifluorene, 3.86 g (31.6 mmol) of phenylboronic acid, 331.5 mg (1.264 mmol) of triphenylphosphine and 70.9 mg (0.316 mmol) of palladium acetate are slurried in a mixture of 65 ml of toluene and 40 ml of aqueous sodium carbonate solution (2 M). With vigorous stirring, the mixture is boiled under reflux for 24 hours. After cooling to room temperature, the solid is filtered off with suction, washed with water and dried in vacuo at 50° C. 2.58 g are obtained. The filtrate is extracted with 50 ml o toluene and the dried organic phase is evaporated to dryness. This gives a further 1.67 g.

Total yield: 4.25 g (86%)

Example 4

2,2',7,7'-Tetrakis(biphenyl)-9,9'-spirobifluorene 5 g (7.9 mmol) of 2,2',7,7'-tetrabromospirobifluorene, 6.57 g (33.2 mmol) of biphenylboronic acid, 331.5 mg (1.264 mmol) of triphenylphosphine and 70.9 mg (0.316 mmol) of palladium acetate are slurried in a mixture of 65 ml of toluene and 40 ml of queous sodium carbonate solution (2 M). With vigorous stirring, the mixture is boiled under reflux for 24 hours. After cooling to room temperature, the solid is filtered off with suction, washed with water and dried in vacuo at 50° C.

Yield: 5.95 g (81%)

Example 5

Synthesis of 2,2',7,7'-tetrabiphenylyl-9,9'-spirobifluorene

In a 250 ml two-necked flask fitted with reflux condenser and precision glass tirrer, 5.5 g of tetrabromospirobifluorene, 7.2 g of biphenylboronic acid and 400 mg of terakis(triphenylphosphine)palladium are slurried in a mixture of 100 ml of toluene and 50 ml of potassium carbonate solution. The mixture is boiled under reflux for 8 hours under a blanket of inert gas while stirring with a precision glass stirrer. After cooling, the product is filtered off with suction, the precipitate is washed with water and dried. The toluene phase is separated off from the filtrate and the aqueous phase is extracted once with chloroform. The combined organic phases are dried over sodium sulfate and evaporated on a rotary evaporator, thus giving a second fraction of the product. The two product fractions are combined (8 g) and dissolved in chloroform. The chloroform solution is boiled with activated carbon and filtered through a short column of silica gel. After evaporation on a rotary evaporator and recrystallization from chloroform/Pentane, colorless crystals which fluoresce blue under UV illumination are obtained. Melting point: 408° C. (DSC).

$^1$H-NMR (CDCl$_3$, ppm): 7.14 (d, J=1.53 Hz, 4H); 7.75 (dd, J=7.93, 1.53 Hz, 4H); 8.01 (d, J=7.93 Hz, 4H); 8.01 (d, J=7.93 Hz, 4H); 7.34 (dd, J=7.32, 1.37 Hz, 4H); 7.42 (t, J=7.32 Hz, 8H); 7.58 (24H).

Example 6

Synthesis of 2,2',4,4',7,7'-hexabiphenylyl-9,9'-spirobifluorene

In a 250 ml two-necked flask fitted with reflux condenser and precision glass stirrer, 1.6 g of hexabromospirobifluorene and 3 g of biphenylboronic acid are slurried in a mixture of 50 ml of toluene and 50 ml of 1 M potassium carbonate solution. The mixture is refluxed under nitrogen and 115 mg of tetrakis(triphenylphosphine)palladium in 5 ml of toluene are added. The mixture is boiled under reflux for 7 hours while stirring. After the reaction is complete, the cooled solution is filtered and the filtrate is extracted twice by shaking with water (to improve the phase separation, chloroform is added). The organic phase is dried over sodium sulfate, filtered through a short column of silica gel and subsequently evaporated on a rotary evaporator. The product is further purified by recrystallization from dichloromethane/pentane. This gives 2 g (80%) of colorless crystals which fluoresce blue under UV illumination.

$^{13}$C-NMR [360 Mhz; ATP, broad-band decoupled] (CDCl$_3$, ppm): 65.94 (1C, spiro-C); 126.95 (6C, CH), 126.97 (6C, CH), 127.17 (6C, CH), 127.35 (6C, CH), 127.36 (6C, CH), 127.39 (6C, CH), 127.52 (6C, CH), 128.73 (6C, CH), 128.75 (6C, CH), 128.94 (6C, CH), 129.90 (4C, CH), 137.77 (2C), 137.86 (2C), 139.43 (2C), 139.69 (2C), 139.89 (2C), 140.09 (2C), 140.17 (2C), 140.22 (2C), 140.30 (2C), 140.63 (2C), 140.64 (2C), 140.68 (2C), 140.72 (2C), 140.74 (2C), 150.45 (2C), 150.92 (2C).

Example 7

Synthesis of 2,2'-bis[5-(p-t-butylphenyl)-1,3,4-oxadiazol-2-yl]-9,9'-spirobifluorene from 9,9'-spirobifluorene-2,2'-dicarboxylic acid chloride and 5-(4-t-butylphenyl)tetrazole a) Synthesis of 5-(4-t-butylphenyl)tetrazole

In a 250 ml round-bottomed flask fitted with reflux condenser, 4.9 g of p-t-butylbenzonitrile, 3.82 g of lithium chloride and 5.85 g of sodium azide and 8.2 g of triethylammonium bromide in 100 ml of DMF are heated at 120° C. for 8 hours. After cooling to room temperature, 100 ml of water are added and the mixture is admicxed in an ice bath with dilute hydrochloric acid until no further solid precipitates. The precipitate is filtered off with suction, washed with water and dried. Recrystallization from ethanol/water gives 4.4 g of colorless crystals.

b) 9,9'-Spirobifluorene-2,2'-dicarboxylic acid chloride

In a 100 ml flask fitted with reflux condenser and drying tube, 2 g (5 mmol) of 9,9'-spirobifluorene-2,2'-dicarboxylic acid together with 20 ml of freshly distilled thionyl chloride and 3 drops of DMF are boilde under reflux for 4 hours. After cooling, the reflux condenser is replaced by a distillation bridge and excess thionyl chloride is distilled off in vacuo, 40 ml of petroleum ether (30–60° C.) are added to the residue and are distilled off, leaving the crystalline acid chloride.

c) 2,2'-Bis[5-(p-t-butylphenyl)-1,3,4-oxadiazol-2-yl]-9,9'-spirobifluorene 2.0 g (11 mmol) of 5-(4-t-butylphenyl)tetrazole dissolved in 20 ml of anhydrous pyridine are added to the acid chloride and the mixture is refluxed under inert gas for 2 hours. After cooling, the mixture is added into 200 ml of water and allowed to stand for 2 hours. The precipitated oxadiazole derivative is fikitered off with suction, washed with water and dried in vacuo. It is subsequently chromatographed over silica gel using chloroform/ethyl acetate (99:1) and recrystallized from chloroform/pentane. This gives 2.4 g of colorless crystals.

$^1$H-NMR (CDCl$_3$, ppm):

1.31 (s, 18H, t-butyl), 6.77 (d, J=7.32 Hz, 2H), 7.18 (td, J=7.48, 1.22 Hz, 2H), 7.44 (td, J=7.40,1.22 Hz, 2H); 7.46 (d, J=8.54 Hz, 4H), 7.50 (d, J=1.22 Hz, 2H), 7.94 (d, J=8.54 Hz, 4H), 8.02 (d, J=7.93 Hz, 6H), 8.20 (dd, J=7.93 Hz, 1.53 Hz, 2H).

Films of the claimed compounds can be prepared by spin coating of vapor deposition on transparent substrates. In the following examples films have been prepared by spin coating from a chloroform solution with a concentration of 10 mg/ml on a non patterned glass substrate. Smooth transparent films were obtained for example with 2,2',7,7'-tetraphenyl-9,9'-spirobifluoren (spiro-4PP), 2,2',7,7'-tetrakis(biphenylyl)-9,9'-spirobifluoren (spiro-6PP), and 2,2',7,7'-tetrakis(terphenylyl)-9,9'-spirobifluoren (spiro-8PP).

These films are irradiated with UV light supplied from a pulsed nitrogen laser light source, at a wavelength of 337 nm (pulse wide 1–2 ns, repetition rate 20 Hz). The spectrum of the emitted light was recorded with an integration time of about 0.3 s. At low energy density of the exciting UV light, the usual blue photoluminescence spectra of each compound can be observed. By increasing the energy density of the exciting UV light, spectral narrowing in the emitted blue light of the three films can be observed.

The full width at halve height (FWHM) of the emitted blue light collapses down to 2 to 3 nm in the experiments.

The invention claimed is:

1. A laser comprising: in order,
a substrate,
an organic layer structure comprising an organic solid laser dye comprising a spiro compound of formula II

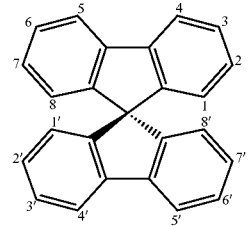

(II)

where the benzo groups can be substituted and/or fused independently of one another.

2. The laser of claim 1, which further comprises a light source selected from the group consisting of a flash lamp and a laser.

3. The laser of claim 2, wherein the light source is a laser.

4. A method of producing coherent laser emission comprising subjecting an organic solid laser dye to a light source wherein said light source excites the organic solid laser dye to emit radiation, the organic solid laser dye comprising a solid spirobifluorene of formula (II)

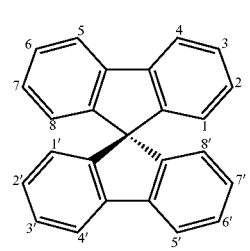

(II)

where the benzo groups can be substituted and/or fused independent of one another.

5. The method of claim 4, wherein said spiro compound is a spirobifluorene derivative of formula (III)

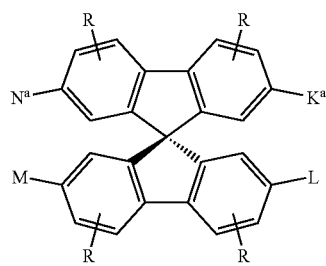

(III)

wherein:
K$^a$, L, M, N$^a$ are identical or different and are

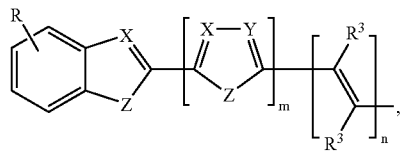

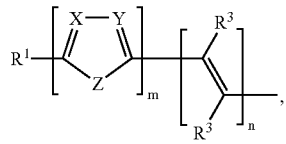

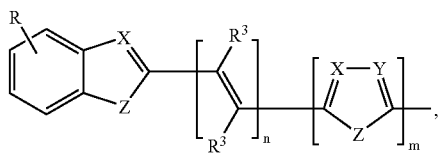

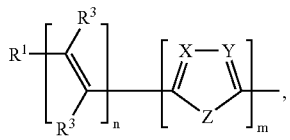

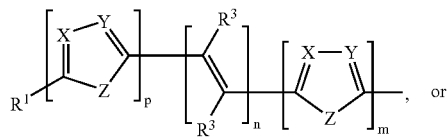

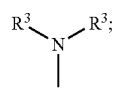

R is identical or different and has the same meaning as $K^a$, L, M, $N^a$ or is H, a linear or branched alkyl, alkoxy or ester group having from 1 to 22 carbon atoms, —CN, —$NO_2$, —$NR^2R^3$, —Ar or —O—Ar;

Ar is phenyl, biphenyl, 1-naphthyl, 2-naphthyl, 2-thienyl, or 2-furyl, with each optionally substituted with one or two radicals R;

m, n, p are 0, 1, 2 or 3;

X, Y are identical or different and are CR or nitrogen;

Z is —O—, —S—, —$NR^1$—, —$CR^1R^4$—, —CH=CH—, or —CH=N—;

$R^1$, $R^4$ are identical or different and have the same meaning as R; and $R^2$, $R^3$ are identical or different and are H, a linear or branched alkyl group having from 1 to 22 carbon atoms, —Ar, or 3-methylphenyl.

6. The method of claim 4 wherein the light source is a laser or a flash lamp.

7. The method of claim 6 wherein the light source is a laser.

8. The laser of claim 1, wherein said spiro compound is a spirobifluorene derivative of formula (III)

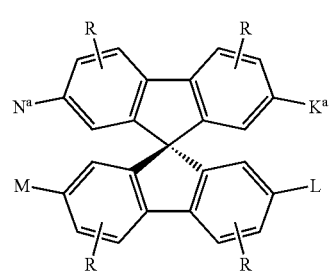

wherein:

$K^a$, L, M, $N^a$ are identical or different and are

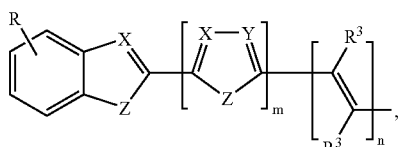

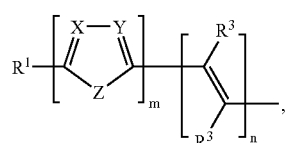

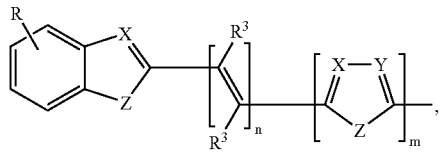

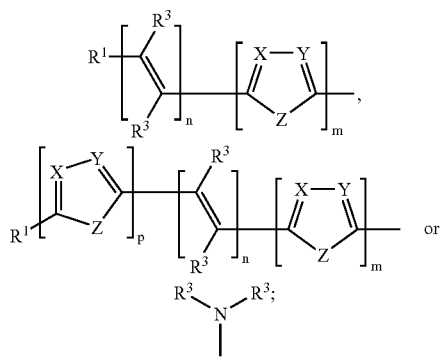

R is identical or different and has the same meaning as $K^a$, L, M, $N^a$ or is H, a linear or branched alkyl, alkoxy or ester group having from 1 to 22 carbon atoms, —CN, —$NO_2$, —$NR^2R^3$, —Ar or —O—Ar;

Ar is phenyl, biphenyl, 1-naphthyl, 2-naphthyl, 2-thienyl, or 2-furyl, with each optionally substituted with one or two radicals R;

m, n and p independently are 0, 1, 2 or 3;

X and Y independently are identical or different and are CR or nitrogen;

Z is —O—, —S—, —$NR^1$—, —$CR^1R^4$—, —CH=CH—, or —CH=N—;

R[1] and R[4] are identical or different and have the same meaning as R; and

R[2] and R[3] are identical or different and are H, a linear or branched alkyl group having from 1 to 22 carbon atoms, —Ar, or 3-methylphenyl.

9. The laser of claim 1, wherein said spiro compound is a spirobifluorene compound selected from the group consisting of the spirobifluorene compounds of the formula (IIIa) to (IIIg), wherein formula (III) is:

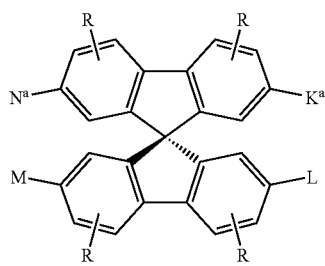

(III)

and the spirobifluorene compounds (IIIa to IIIg) are derivatives of formula (III) as follows:

IIIa) $K^a=L=M=N^a$ and is selected from the group consisting of:

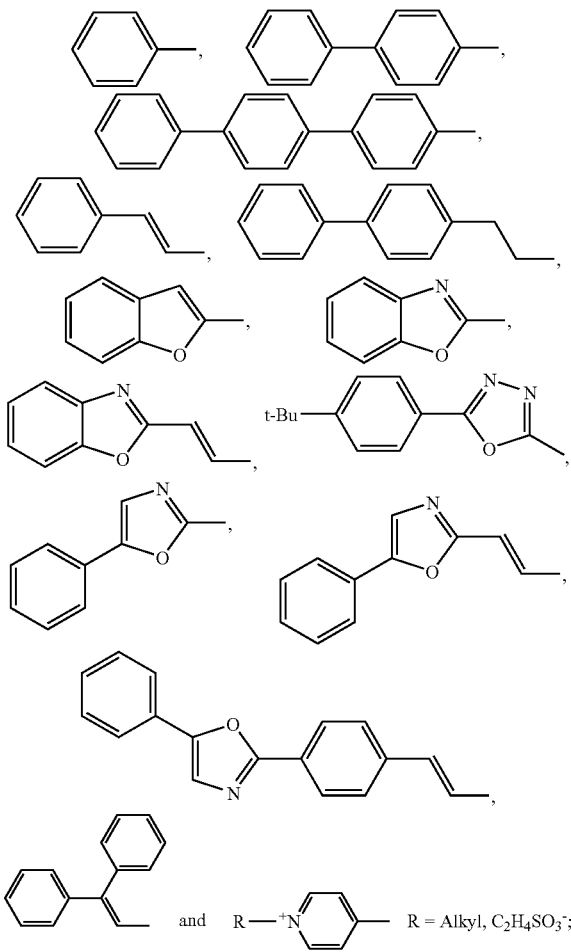

and R—$^+$N—  R = Alkyl, $C_2H_4SO_3^-$;

IIIb) $K^a=M=H$ and $N^a=L$ and is selected from the group consisting of:

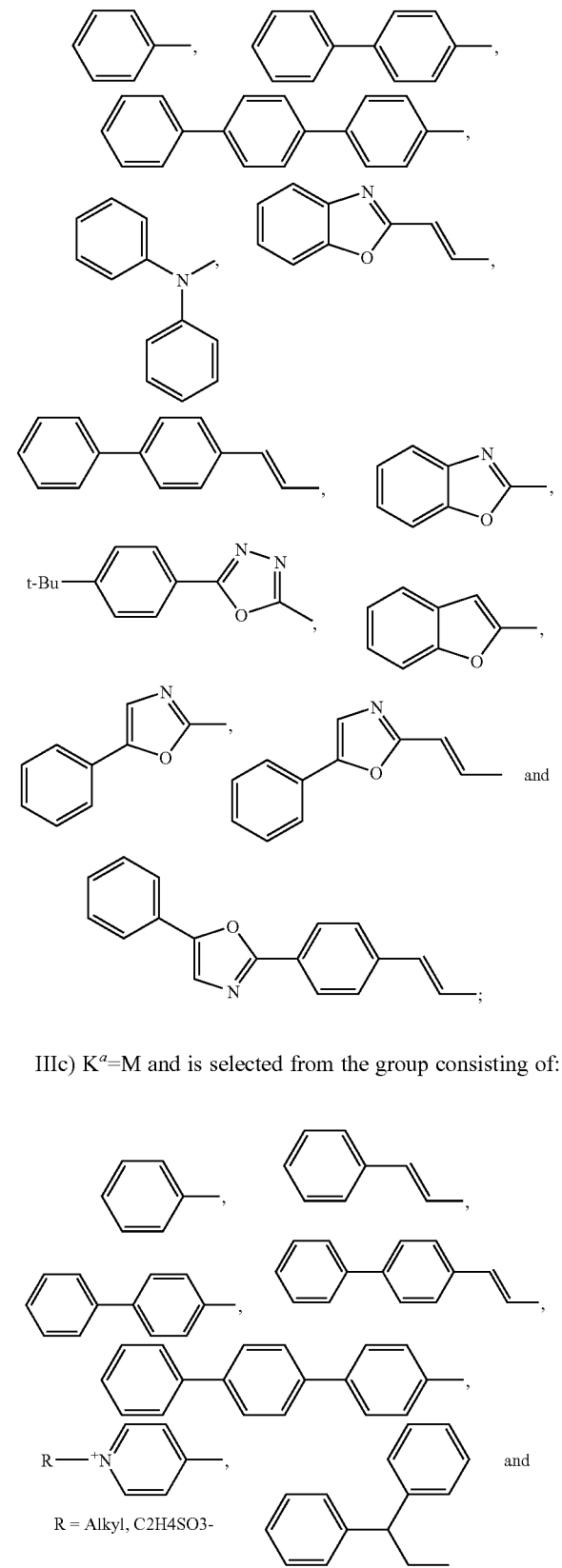

IIIc) $K^a=M$ and is selected from the group consisting of:

R = Alkyl, C2H4SO3-

-continued and N$^a$=L and is selected from the group consisting of:

IIId) K$^a$=M and is selected from the group consisting of:

and N$^a$=L and is selected from the group consisting of:

R = Alkyl, C$_2$H$_4$SO$_3^-$;

IIIe) K$^a$=L=H and M=N$^a$ and is selected from the group consisting of:

IIIf) K$^a$=L and is selected from the group consisting of:

-continued

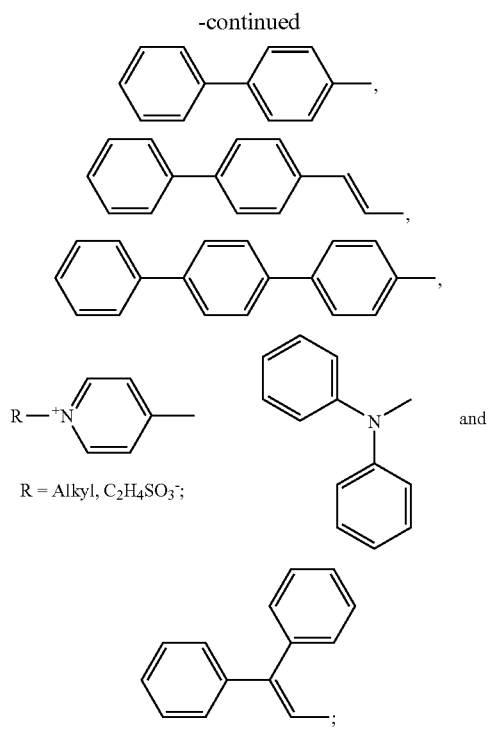

R = Alkyl, C₂H₄SO₃⁻;

and M=N$^a$ and is selected from the group consisting of:

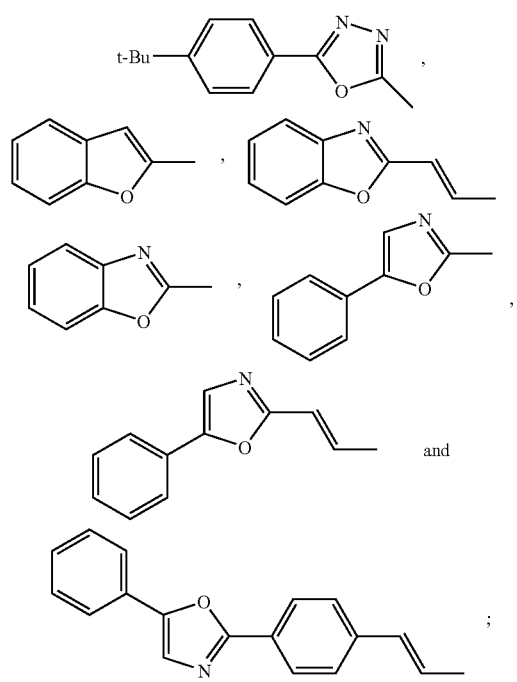

IIIg) K$^a$=L and is selected from the group consisting of:

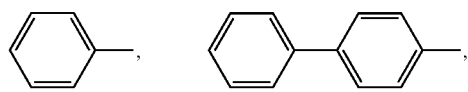

-continued

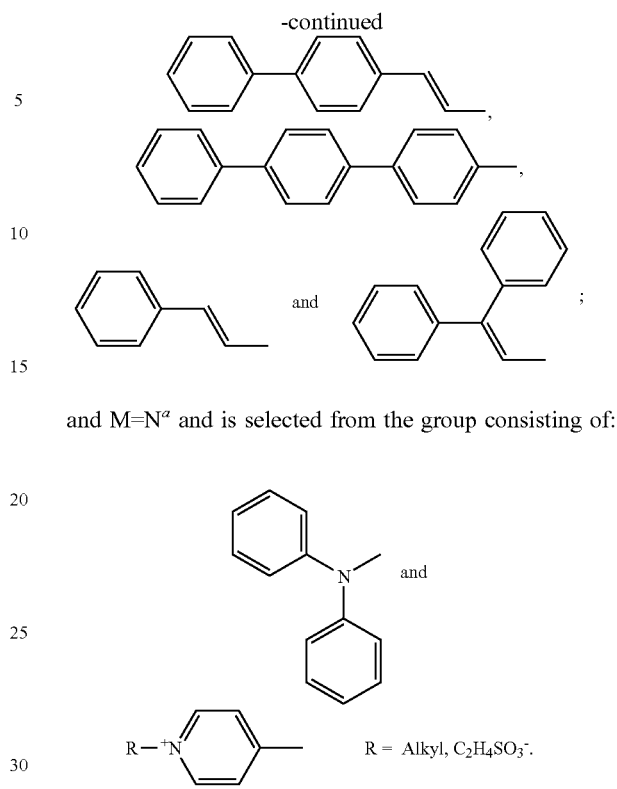

and M=N$^a$ and is selected from the group consisting of:

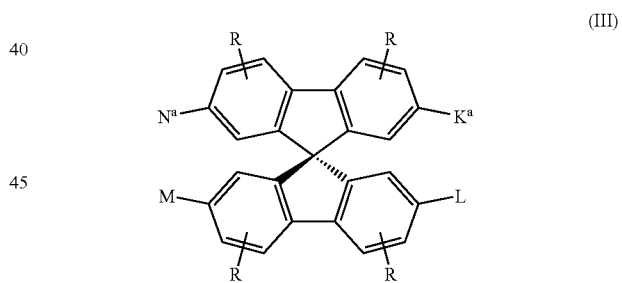

R = Alkyl, C₂H₄SO₃⁻.

10. The method of claim 1, wherein said spiro compound is a spirobifluorene compound selected from the group consisting of the spirobifluorene compounds of the formula (IIIa) to (IIIg), wherein formula (III) is:

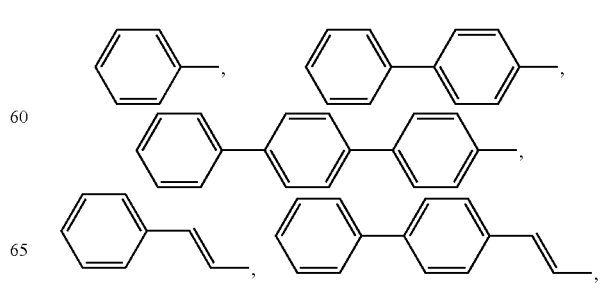

(III)

and the spirobifluorene compounds (IIIa to IIIg) are derivatives of formula (III) as follows:

IIIa) K$^a$=L=M=N$^a$ and is selected from the group consisting of:

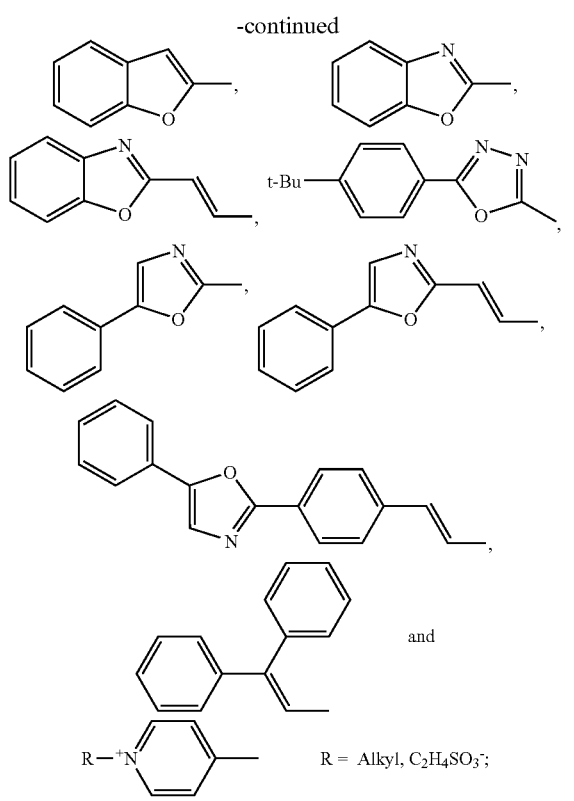
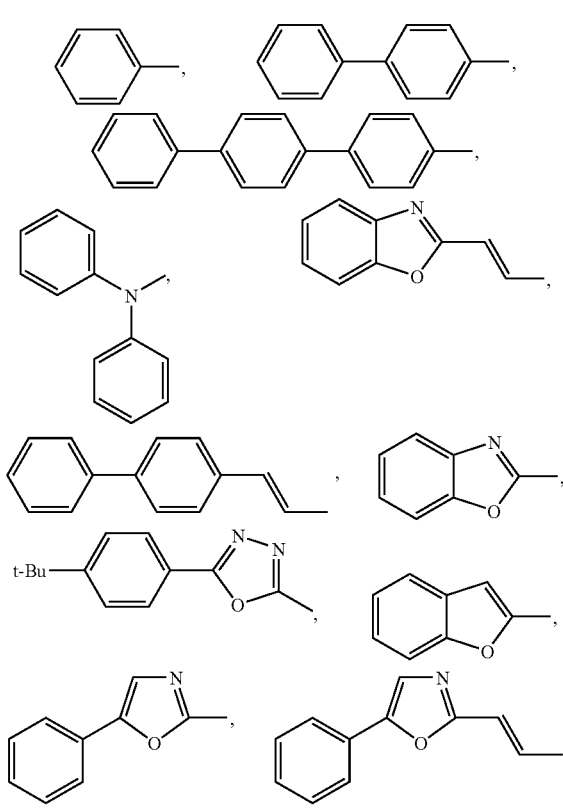
IIIb) $K^a=M=H$ and $N^a=L$ and is selected from the group consisting of:
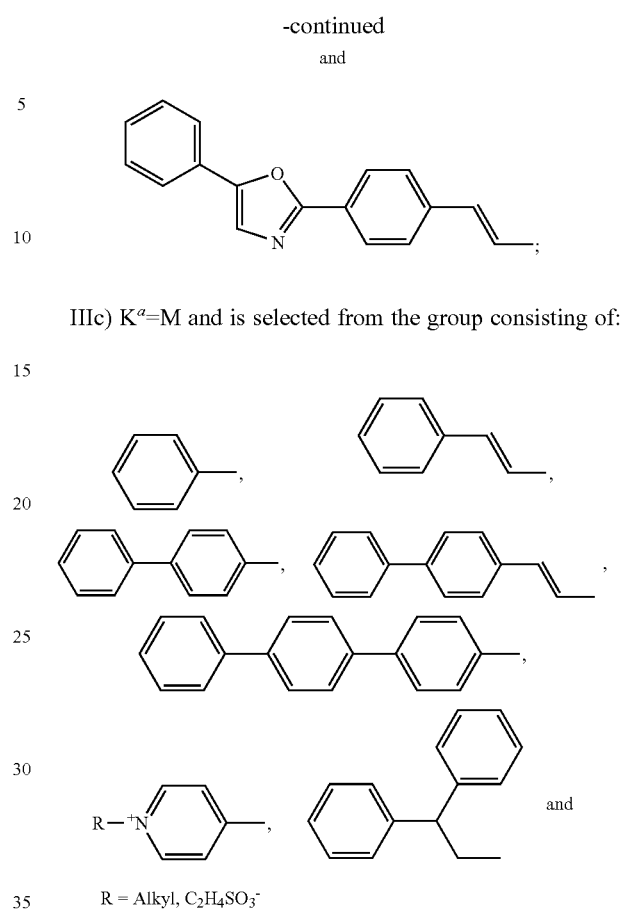
IIIc) $K^a=M$ and is selected from the group consisting of:
and $N^a=L$ and is selected from the group consisting of
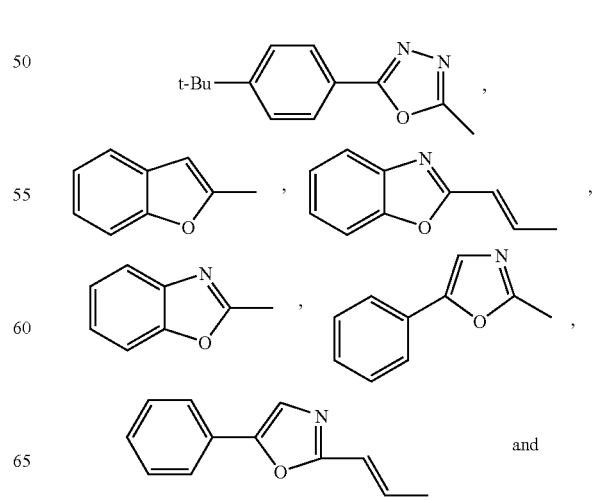

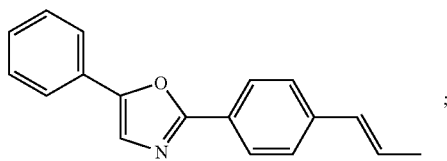
IIId) $K^a$=M and is selected from the group consisting of:
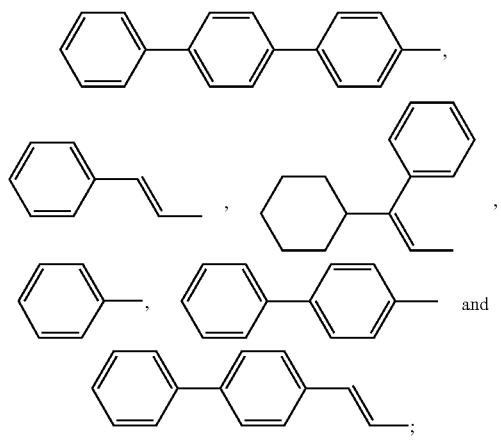
and $N^a$=L and is selected from the group consisting of:
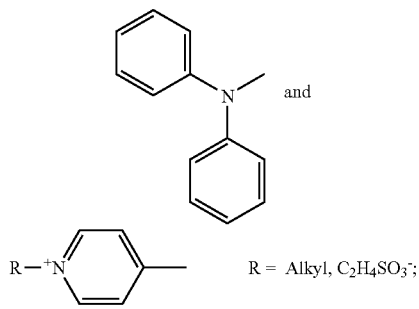
R = Alkyl, $C_2H_4SO_3^-$;
IIIe) $K^a$=L=H and M=$N^a$ and is selected from the group consisting of:
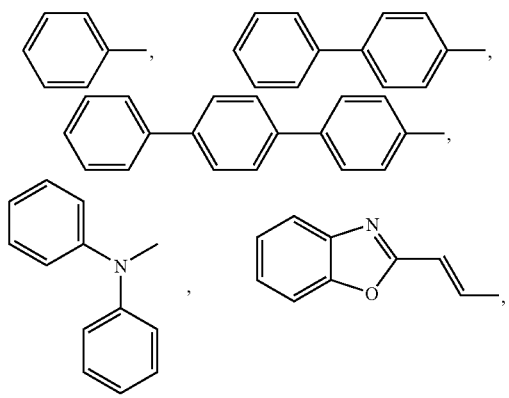
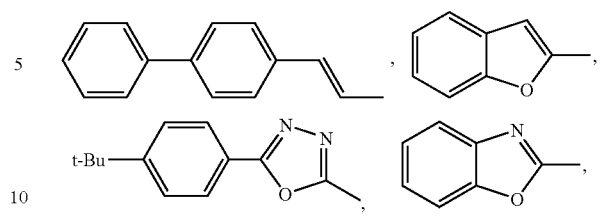
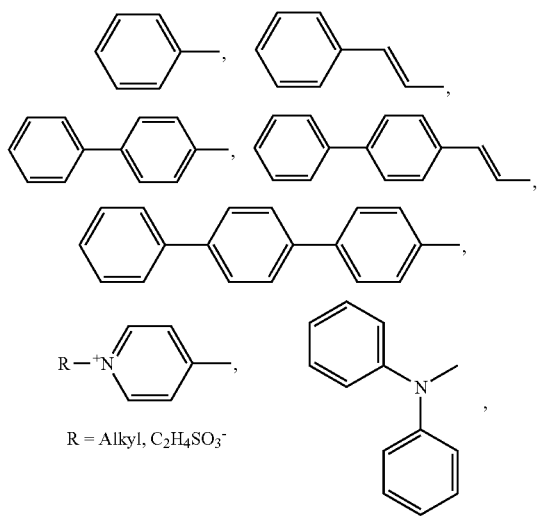
IIIf) $K^a$=L and is selected from the group consisting of:
R = Alkyl, $C_2H_4SO_3^-$
and M=$N^a$ and is selected from the group consisting of
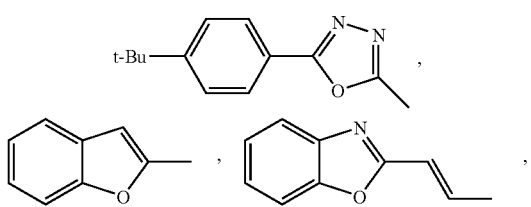

-continued
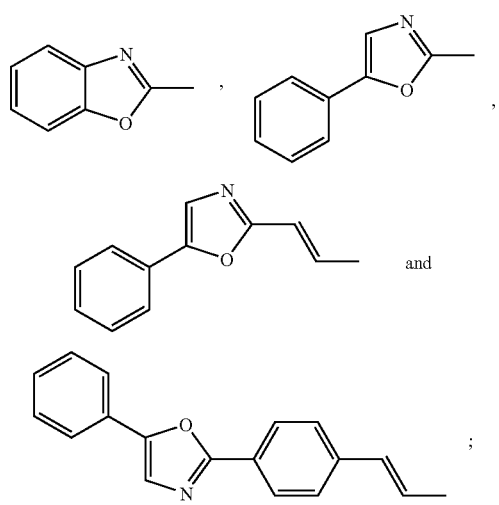
IIIg) $K^a=L$ and is selected from the group consisting of:
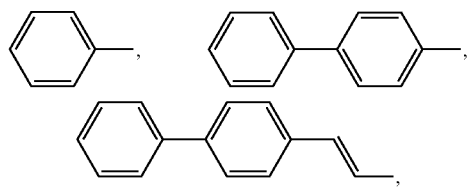
-continued
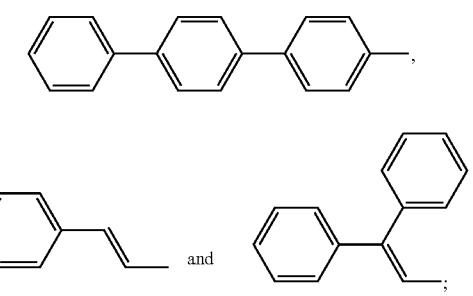
and $M=N^a$ and is selected from the group consisting of:
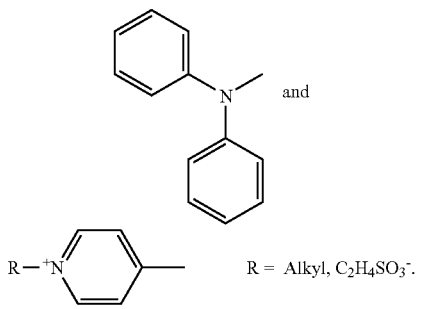
R = Alkyl, $C_2H_4SO_3^-$.
* * * * *

UNITED STATES PATENT AND TRADEMARK OFFICE
CERTIFICATE OF CORRECTION

PATENT NO. : 7,088,757 B1  Page 1 of 2
APPLICATION NO. : 09/601434
DATED : August 8, 2006
INVENTOR(S) : Nu Yu et al.

It is certified that error appears in the above-identified patent and that said Letters Patent is hereby corrected as shown below:

On the TITLE Page:

Item (73), Assignee:, "Semiconductors GmbH (DE)" should read -- Covion Organic Semiconductors GmbH (DE) --

In the Claims:

In Claim 5, column 25, line 53, "m, n, pare 0, 1, 2 or 3;" should read -- m, n, p are 0, 1, 2 or 3; --

In Claim 9, column 27, line 37, should read

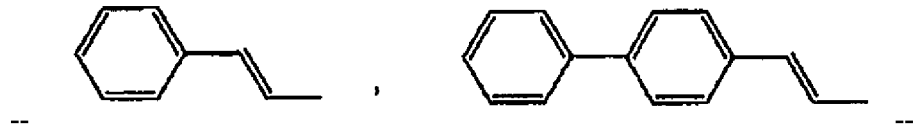

In Claim 9, column 28, line 65, "R = Alkyl, C2H4SO3-" should read -- R = Alkyl, $C_2H_4SO_3$- --

UNITED STATES PATENT AND TRADEMARK OFFICE
CERTIFICATE OF CORRECTION

PATENT NO. : 7,088,757 B1
APPLICATION NO. : 09/601434
DATED : August 8, 2006
INVENTOR(S) : Nu Yu et al.

It is certified that error appears in the above-identified patent and that said Letters Patent is hereby corrected as shown below:

In Claim 10, column 32, line 33, "10. The method of claim 1, wherein said spiro compound" should read -- 10. The method of claim 4, wherein said spiro compound --

Signed and Sealed this

Twenty-third Day of January, 2007

JON W. DUDAS
*Director of the United States Patent and Trademark Office*